March 16, 1926. 1,576,995
C. O. PROWSE
AEROFOIL
Filed June 22, 1921  8 Sheets-Sheet 1
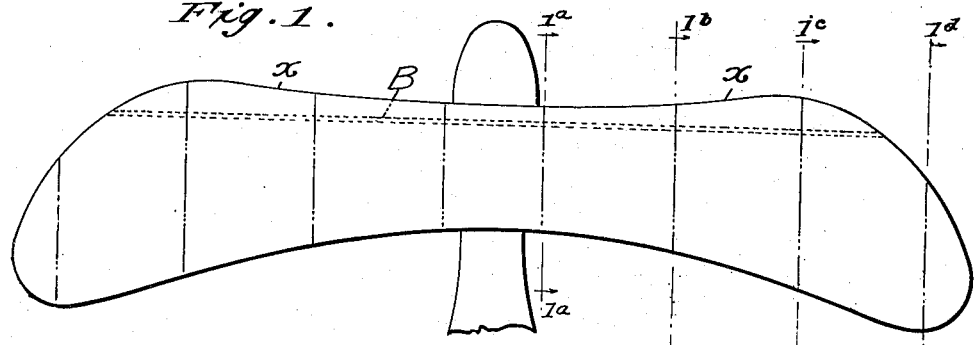
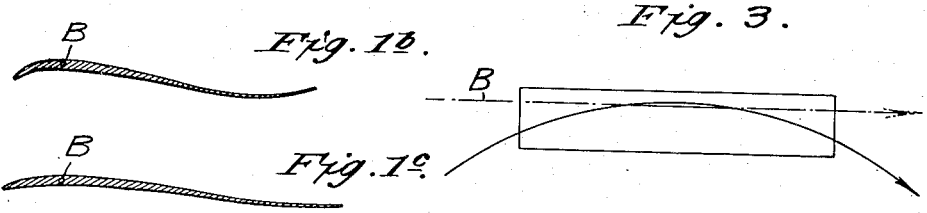
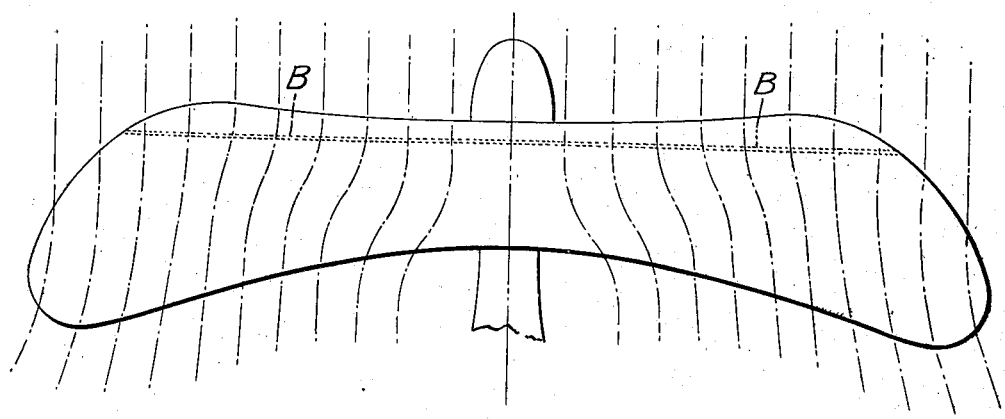
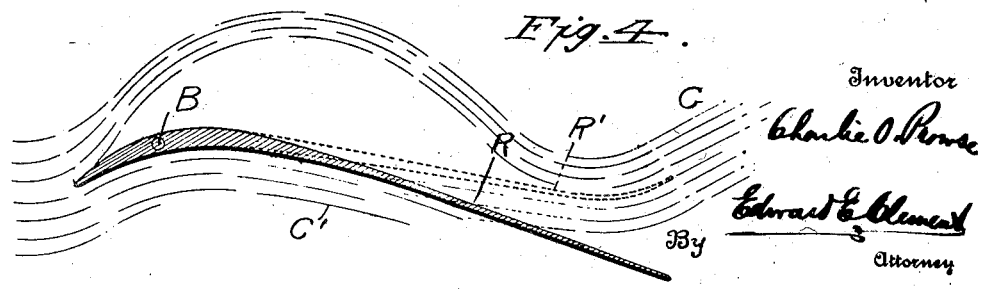

March 16, 1926.

C. O. PROWSE

AEROFOIL

Filed June 22, 1921

Inventor
Charlie O. Prowse

By Edward E. Clement
Attorney

March 16, 1926.
C. O. PROWSE
AEROFOIL
Filed June 22, 1921
1,576,995
8 Sheets-Sheet 3
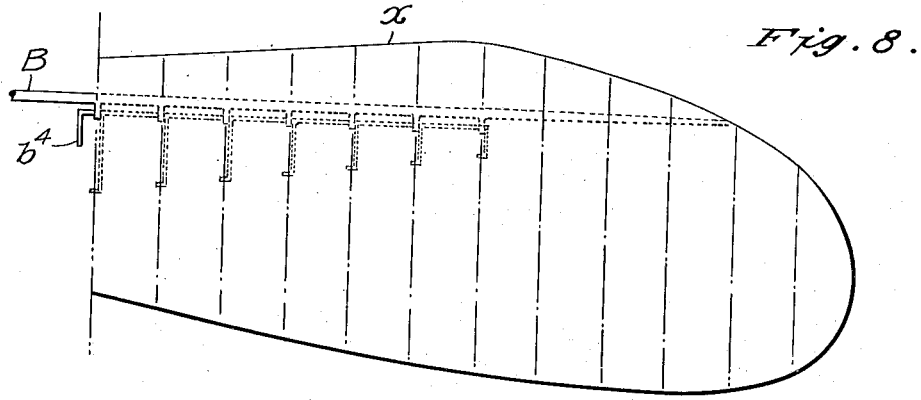
Fig. 8.
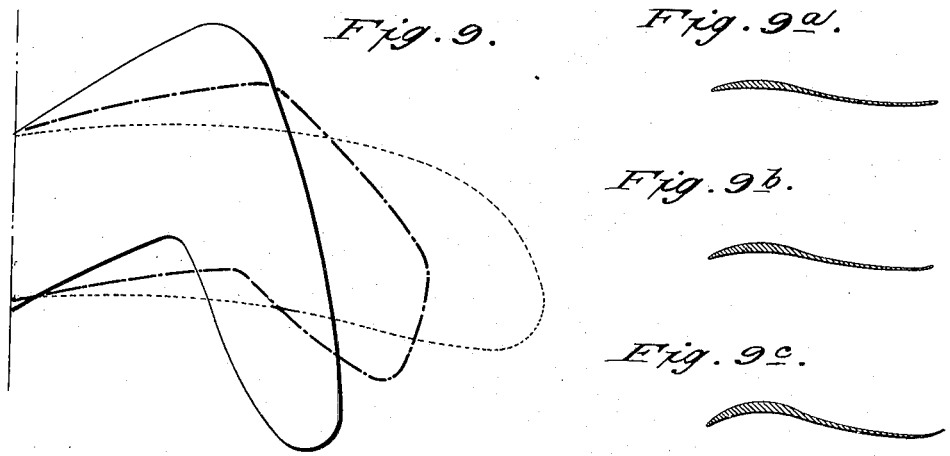
Fig. 9.   Fig. 9ª.
Fig. 9ᵇ.
Fig. 9ᶜ.
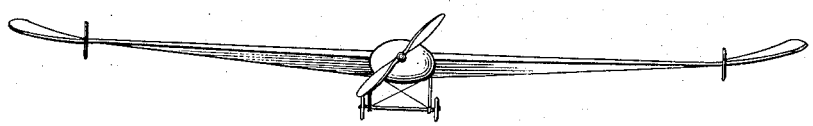
Fig. 10.
Inventor
Charlie O. Prowse
By Edward E. Clemery
Attorney March 16, 1926.
C. O. PROWSE
1,576,995
AEROFOIL
Filed June 22, 1921
8 Sheets-Sheet 4
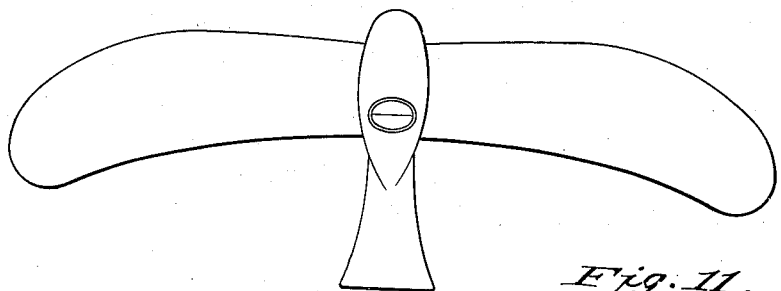
Fig. 11.
Fig. 12ª
Fig. 12.
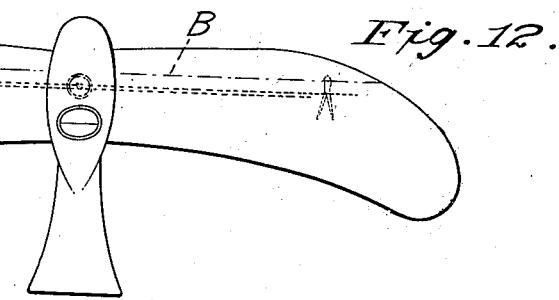
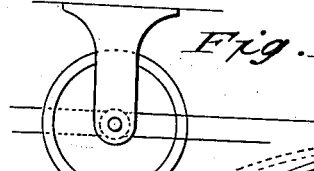
Fig. 12b
Fig. 13.
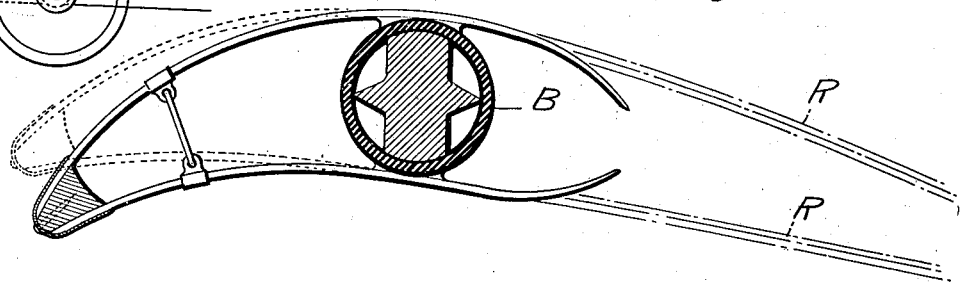
Fig. 14.
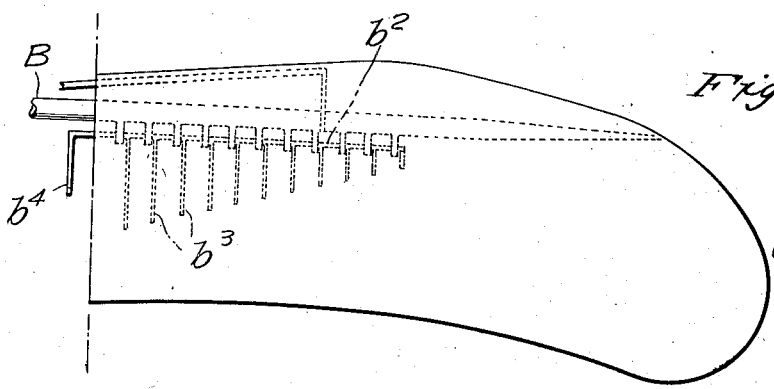
Inventor
Charles O. Prowse
Edward E. Clement
Attorney

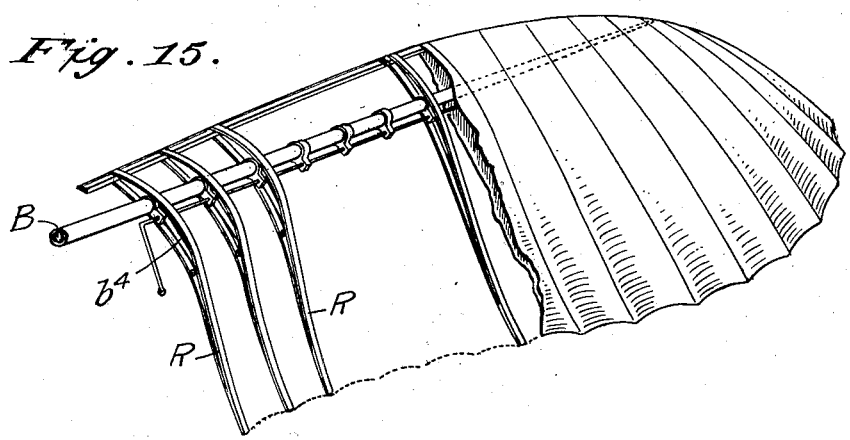
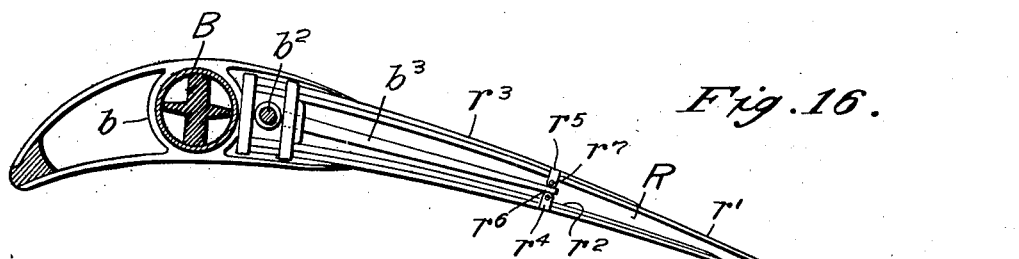
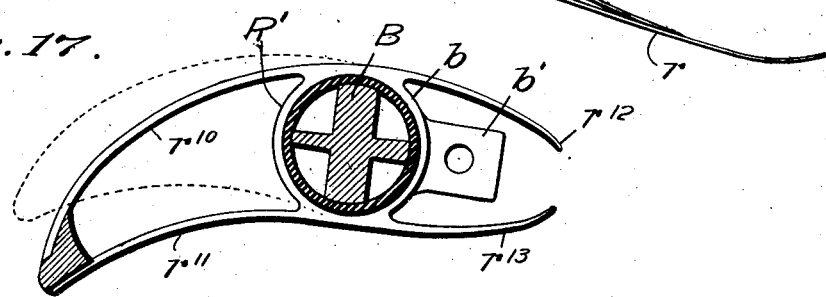
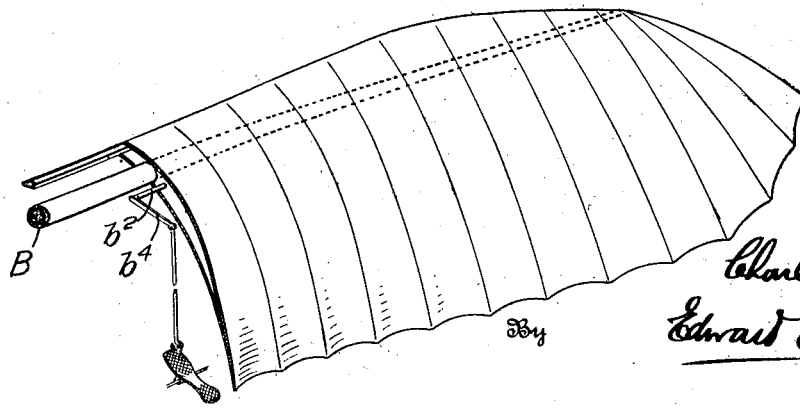

March 16, 1926.
C. O. PROWSE
AEROFOIL
Filed June 22, 1921   8 Sheets-Sheet 6
1,576,995
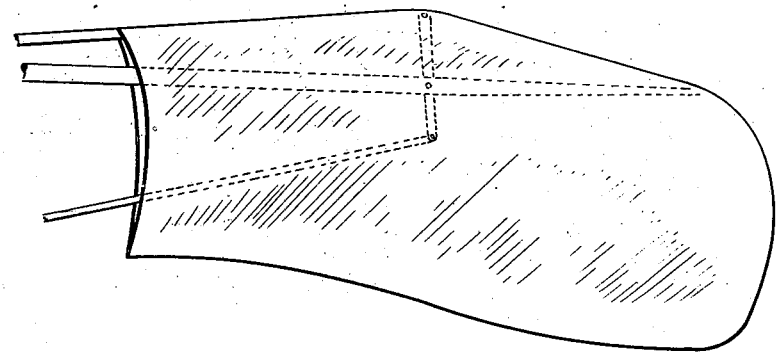
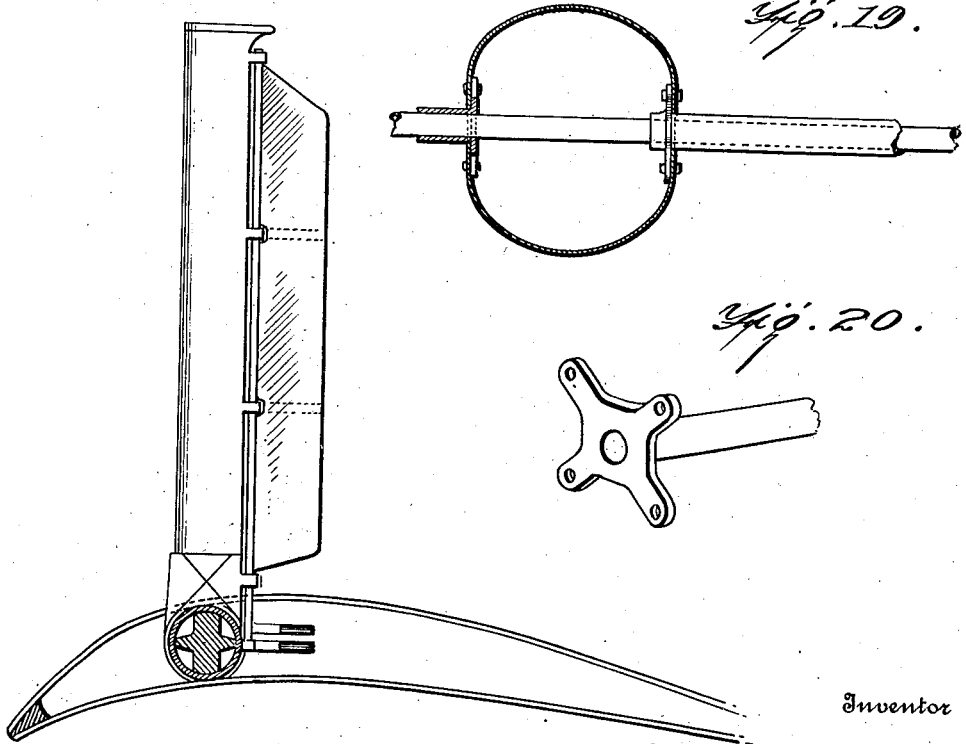
Inventor
Charlie O. Prowse
By Edward E. Clement
Attorney March 16, 1926.                                                          1,576,995
                    C. O. PROWSE
                      AEROFOIL
              Filed June 22, 1921           8 Sheets-Sheet 7
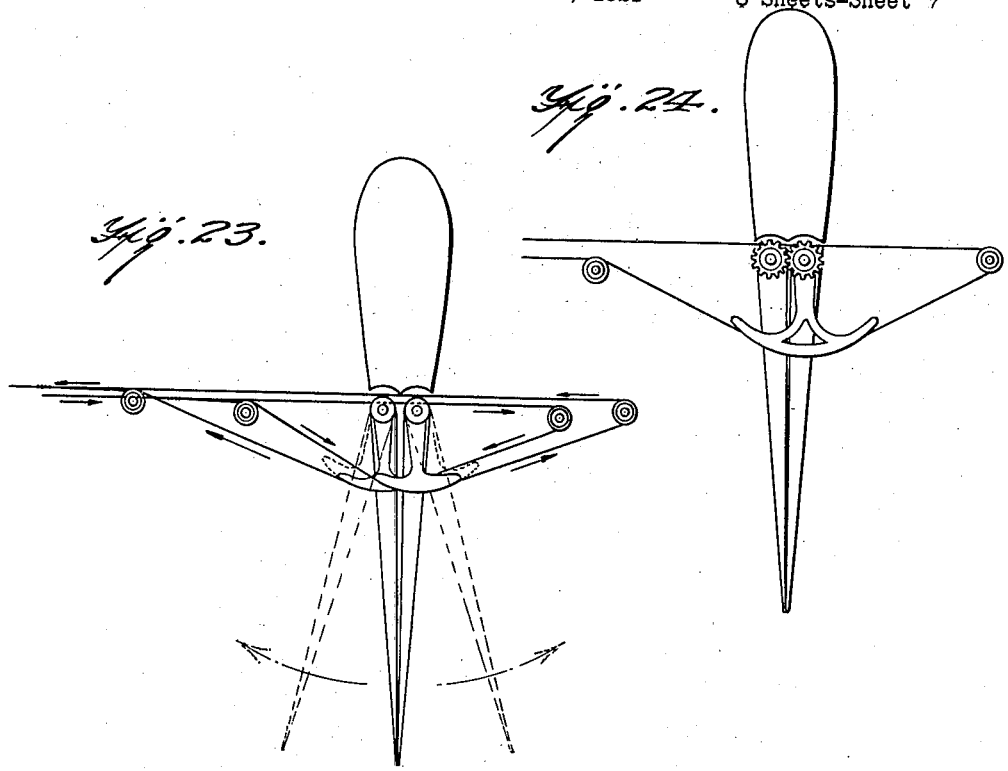
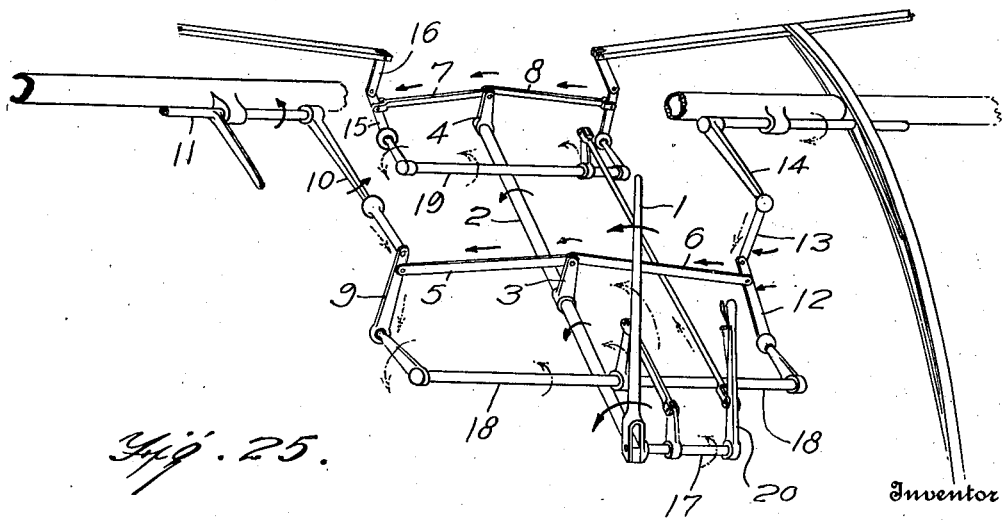

March 16, 1926.
C. O. PROWSE
AEROFOIL
Filed June 22, 1921   8 Sheets-Sheet 8
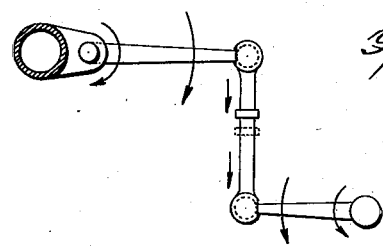
Fig. 26.
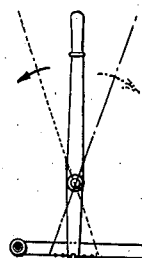
Fig. 27.
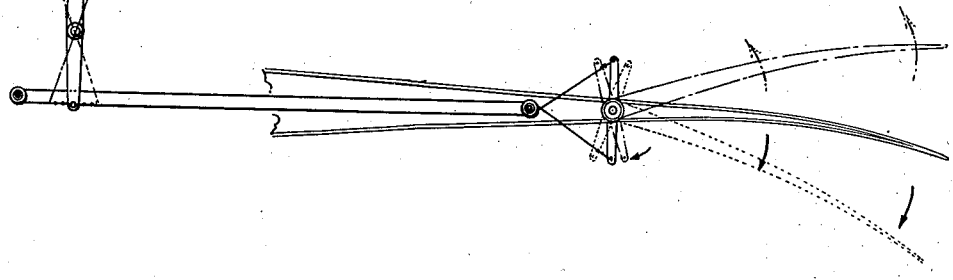
Fig. 28.
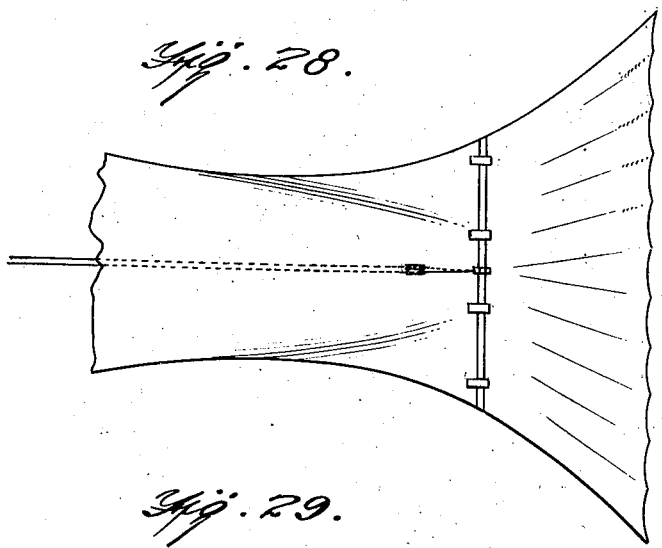
Fig. 29.
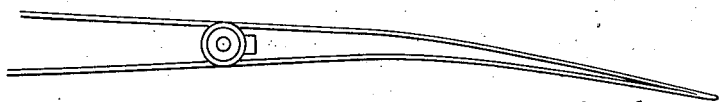
Inventor
Charlie O. Prowse
By Edward E. Clement
Attorney Patented Mar. 16, 1926.

1,576,995

UNITED STATES PATENT OFFICE.

CHARLIE O. PROWSE, OF NEW YORK, N. Y.

AEROFOIL.

Application filed June 22, 1921. Serial No. 479,638.

*To all whom it may concern:*

Be it known that I, CHARLIE O. PROWSE, a citizen of the United States, residing at New York city, New York County, New York State, have invented certain new and useful Improvements in Aerofoils, of which the following is a specification, reference being had therein to the accompanying drawing.

My invention relates to the art of aviation, and has for its object the production of a type of aerofoil having the following characteristics: (1) increased stability; (2) increased gliding ability and lift-drift ratio; and (3) inherent progression or forward pressure.

Briefly stated, I attain my object by constructing a plane or aerofoil with high aspect ratio, variable cambered flexible ribs from center to the tip or outward end of aerofoil, and a slight sweep forward to near the center and from this point a decided "sweep back to the tip."

The mechanical features, which will appear in detail hereinafter, include a wing beam, of which there is preferably one to each plane, of suitable strength for carrying the weight of the machine with proper factor of safety, a metallic tube around the wing beam, rigidly attached to the fuselage and flexible ribs; the wing beam (or beams if more than one be used) being forward of the "center of pressure," that is between the center of pressure and the cutting edge of the plane. The rib members show the deepest camber of both top and bottom surface nearest the fuselage or center of the aerofoil and gradually flatten toward the tip or end. This causes the air to pocket at the point of deepest camber, escaping at the point of least resistance, i. e. outward toward the end of the wing, thus producing the same results as a "high" dihedral angle without its known bad effects, and increasing the tendency of the machine to automatically recover its lateral balance when disturbed. Automatic stabilizing is further attained by the flexible rib members, which are semi-rigid at the fuselage or center of the wing section and increase in their flexibility toward the wing tip or outer end.

My invention is illustrated in the accompanying drawings, in which:

Fig. 1 is a plan view of an aerofoil or plane, showing in dotted lines the location of the wing beam.

Figs. 1ª, 1ᵇ, 1ᶜ, and 1ᵈ are sections on lines 1ª, 1ᵇ, 1ᶜ, and 1ᵈ, of Figure 1.

Fig. 2 is a diagram showing the movement or tendency of the air currents crossing the aerofoil, due to the construction of Figure 1.

Fig. 3 is a diagram showing theoretical and actual "center of pressure" by dotted and solid lines respectively.

Figure 5:
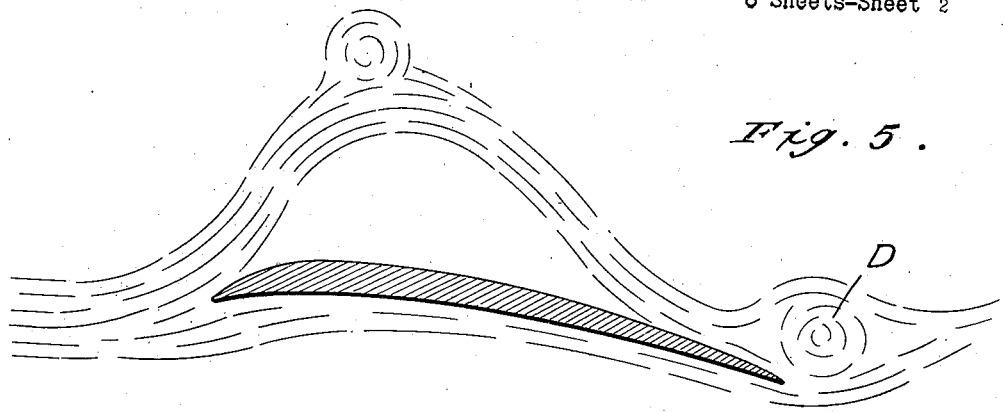
Figure 6:
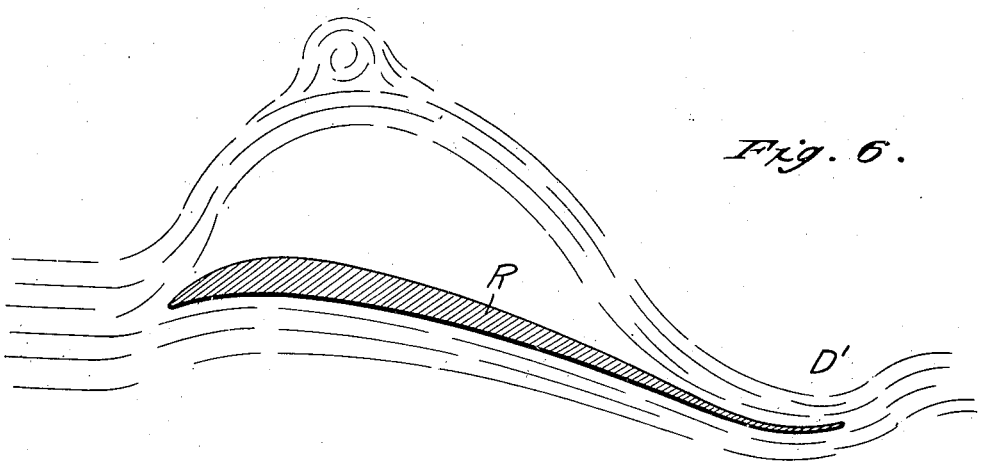

Figs. 4, 5, and 6 are diagrammatic sectional views showing the comparative effects of fixed camber and flexible ribs or "trailing edges" of an aerofoil.

Figure 7:
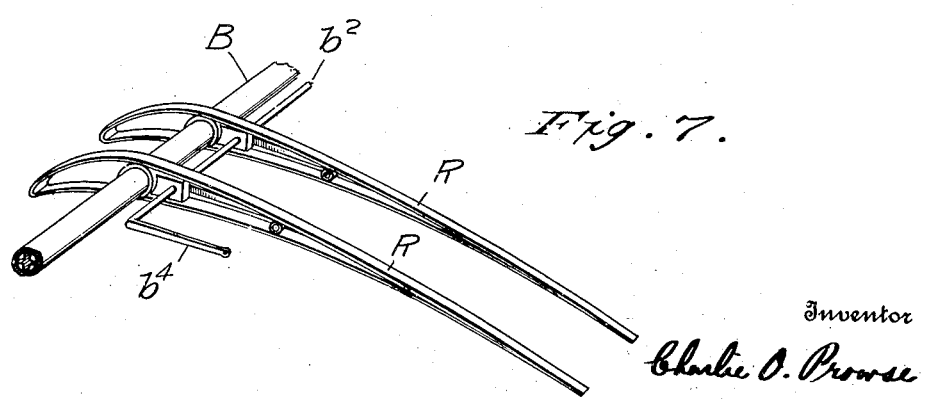

Figs. 7, 8, and 16 are detail figures showing the main features of mechanism of my invention for flexing the ribs.

Figs. 9, 9ª, 9ᵇ, and 9ᶜ show diagrammatically the shapes in plan and the varying camber of a buzzard's wing, under different conditions.

Figs. 10, 11, and 12 are diagrams of a monoplane, showing improved steering means, and streamline fuselage, due to use of construction shown in preceding figures.

Figs. 12ª and 12ᵇ show details of the control mechanism.

Figs. 13, 14, 15, and 17 show portions of the mechanism for, and illustrate the principle employed in shifting the cutting edge of the aerofoil with respect to the wing beam. Fig. 18 is a view similar to Fig. 15, showing control mechanism.

Figs. 19 and 20 show details of the means for attaching the fuselage to the main supporting beam.

Fig. 21 shows modified means for flexing the wing surfaces to vary the camber.

Figs. 22, 23, and 24 show details of the mechanism for direction control illustrated in Fig. 12.

Fig. 25 shows detail of the camber control of Figs 7, 8, and 16.

Figs. 26, 27, 28, and 29 show details of the elevator with flexible ribs, and control therefor.

Referring to the drawings, Figs. 1, 1ª, 1ᵇ, 1ᶜ, and 1ᵈ show the high aspect ratio, and variable cambered flexible ribs from center to the tip or outward end of aerofoil, with a slight sweep forward of the front edge from the center to points on each side thereof and from this point a decided sweep back to the tip. The rib members show the deepest camber of both top and bottom surface nearest the fuselage at center of the aerofoil, and gradually flatten toward the tip or end. This causes the air to pocket at the point of deepest camber, escaping at the point of least resistance, which is outward toward the end of the wing. This movement of the air currents crossing the aerofoil is shown in Fig. 2, being indicated by dotted lines. This direction of the air currents produces in effect the same results as a high dihedral angle without its known bad effects, and together with a slight dihedral angle of from 4 to 6 degrees, results in a further division of the air currents crossing the aerofoil, increasing the tendency of the machine to recover its lateral balance when disturbed. The slight sweep forward of the entering edge of the aerofoil shown at $x$ in Figure 1 also produces a dividing effect upon said crossing currents. With these three features, each producing a dividing effect, division is had sufficient to create an exceedingly strong tendency of the machine to automatically correct its lateral balance under all circumstances.

Referring to Figures 1, 2, 7, 13, 14, 15, 16, 17, and 18, in all of these figures appears a feature necessary to be here described, which I have referred to as a wing beam. Preferably there is but one beam, as shown, to each plane, and it is designated throughout by the letter B. This consists of a beam of suitable strength to carry the weight of the machine with proper factor of safety. Around the beam a metallic tube $b$ is fitted and rigidly attached to the fuselage. The ribs R, carrying the "center of weight or pressure" at a point other than in the center of the beam B have a tendency to turn or twist the tube around the beam, but the tube being rigidly attached to the fuselage and to such struts as may be used in multi-plane construction, is strong enough to resist this turning or torsional movement. Figures 19 and 20 show a mode of attaching a monoplane fuselage.

More than one beam may be employed without departing from my invention, but if so, the beams must be so arranged in relation to the rib members, that all of them will be forward of the center of pressure, that is between such center and the cutting edge of the plane, for a reason presently to be explained. The nearer the cutting edge, the better, leaving, of course, a proper factor of safety. The operation of the cutting edge according to my invention will also be explained presently.

The flexible rib members R, best shown in Figures 7, 13, 15, and 16, and indicated in Figs. 8, 14, 18, assist materially in automatically stabilizing the machine. These ribs are semi-rigid at the fuselage or center of the wing section and increase in their flexibility toward the wing tip or outer end. Automatic stabilizing effect is produced, first, by reason of their greater resistance at the center of the aerofoil and the gradual reduction of their rigidity toward the outer end of the plane, the air currents passing toward the point of least resistance, that is outwardly; and second, because a wing section having flexible rib members is not so materially disturbed by gusts, whirls, and upward and downward currents as a rigid section, since the rib members will automatically change, to some degree, their camber and angle of attack.

It is claimed by some engineers that an aerofoil having a decreasing chord from center to tip is the ideal wing section. A similar effect is claimed for the aerofoil here presented, it being an aerofoil having apparently the same chord but a decided decreasing camber. In comparison, the "ideal" referred to, gives a slight decrease in camber as well as a slight decrease in chord: here the greater decrease in camber obtains the same result as the other while the chord remains apparently the same, obtaining thereby results that the other does not produce, namely, flexibility, tendency to stabilize and an inherent progressive property that will be mentioned later.

The slight sweep forward, at $x$—$x$, Figs. 1, 2, and 8 besides producing the results above mentioned, tends to reduce to a straighter line, the center of pressure on the aerofoil. In Fig. 3 the dotted lines represent the supposed "C P" (center of pressure) and the solid line represents nearer the actual "C P." The actual "C P" will move forward in conformity with this sweep forward at $x$, for the reason that the slip of the air near the tip will be less on account of the variable camber, which has a tendency to compress the air at the tip (it being the point of escape) as the air from the deeper camber there comes in contact with pressure from the outer currents. Further, it is known that a flexible trailing edge reduces the movement of the "C P", and these features have a decided tendency to increase the stability of the machine longitudinally.

In the plane herein illustrated, instead of an ordinary "trailing edge", my flexible ribs produce the equivalent of a trailing edge but extend the effect to more than 75% of the entire surface. In Figure 4 I have shown a diagrammatic section through such a rib, and indicated the air currents by curved broken lines. The inherent progressive property, and the power upon which it depends, will be understood from this figure. B indicates the rib, normal, $R^1$ the same rib in distorted or "off-normal" position, and C—$C^1$ the air currents passing above and below, which by suction above and upward pressure or lift from below cause the distortion of R to position $R^1$.

The resistance of member R to these forces is registered in forward pressure against beam member B, and such registration of pressure continues to long as the member R is distorted, i. e. so long as the air pressure is maintained.

Power is thus transmitted from the passing air currents to the rigid portion (here the beam B) of the plane, and results in forward pressure, with which I overcome in part or wholly, the so-called "head-resistance." When analyzed the greatest part of this "head-resistance" is found to be really drag. Experiments with a column of smoke driven over a rigid plane and photographed, show a much disturbed area following the plane and comparable in appearance and effect to the drag in wake of a boat in water. Fig. 5 shows the disturbed area at D, and Fig. 6 shows at $D^1$ how the disturbance is eliminated by the flexing of the rib member R. The inherent propulsive tendency of this arrangement overcomes the "head resistance" to such an extent that a lift-drift ratio of from 40 to 50 to 1 may be easily attained.

The trailing edge rib R should be similar to a sword blade, that is, its ability to resist pressure gradually decreases from its beginning at the wing beam to its end or point at the rear edge of the aerofoil, offering slight resistance at its extremity, blending, as it were, into the actual movement of the air currents. It is understood that the flexible rib is made of such resilient material as will bend under pressure, such as steel, and the camber is greater than it would be if the rib were rigid, allowing the pressure of the lift to bring the camber to the proper design. Such a rib member materially increases the gliding ratio of any machine, especially when the variable cambered aerofoil is used, as described.

Referring to Figures 9, and $9^a$ to $9^c$, the relation between the flexible "trailing edge" effect and the advanced rigid support is illustrated by reference to a buzzard's wing. As well known, the buzzard soars upward in large circles. Observation and tests made by this applicant through an extensive period of experimental work show that the buzzard's wing increases and decreases its camber at will; that he soars into, with, and across extreme high winds, and in winds varying down to low pressure; and that he does not depend on rising currents. Casts of buzzards' wings in the different positions assumed show that the camber varies with the position as in Figs. 9 to $9^c$. In Fig. 9 the dotted line shows position in calm air, and the corresponding camber is indicated in Fig. $9^c$; the broken line shows the position assumed in medium high winds, with camber indicated in Fig. $9^b$; and the solid line shows the position in high winds, with corresponding camber in Fig. $9^a$. Thus, greater flexibility given to the trailing edge, diminished camber and aspect ratio are used in extreme high winds, while the reverse, i. e. shorter trailing edge at the outer end of the wing, greater aspect ratio, and deeper camber both top and bottom, are used in calm air.

It is of course true that bird wing area does not carry the load of the aeroplane, but it furnishes a useful analogue for purposes of explanation.

Means for flexing the ribs to change the camber independently of external action by the air currents, are indicated in Figs. 7, 13, 14, 15, 16, 17, and 18. Referring first to Figs 7 and 17, rearward extensions $b^1$ from the wing beam B of each wing contain aligned journal bearings for a flexing shaft $b^2$ which lies parallel with the beam B. To this shaft are attached integral arms $b^3$, one for each rib, which extends rearwardly between the upper and lower members of the rib, and is connected to both of them. At the fuselage end of the shaft $b^2$ is an operating lever $b^4$, secured rigidly to the shaft and lying within reach of the pilot or adapted to be worked by such controls as may be found convenient and desirable (see Fig. 18). The arrangement of the shaft $b^2$ and its connected parts $b^3$ and $b^4$ is shown in plan in Figures 8 and 14, in perspective in Figs. 7, 15, and 18 and in detail in Figs. 16 and 17. Referring to said Figs. 16 and 17, the latter shows the structure, stripped, by which the rib is secured to the beam B. This comprises a ring $R^1$ carrying two curved arms $r^{10}$—$r^{11}$ extending forwardly to form the entering edge of the plane, and two curved arms $r^{12}$—$r^{13}$ extending rearwardly with the bearing block $b'$ between them. The arms $r^{12}$ and $r^{13}$ are stubs of the flexing portions of the rib, but in themselves have small range of movement. As shown in Fig. 16, they are sprung apart and upper and lower leaf springs R forming the rib proper, are inserted between them, the thickened ends of these leaf springs resting on the block $b^1$, to which they are rigidly clamped by steel or other suitable straps. The under rib member is formed by a long spring $r$, upon which rests a shorter reinforce leaf $r^2$. The upper rib member is composed of a long spring slightly curved at its end to lie upon and work in unison with spring $r$, and a shorter reinforce leaf $r^3$ over the spring $r^1$. The connections of the arm $b^3$ with this arrangement of reinforce members of the rib necessarily have more detail than with the simple form of Fig. 7. A pair of shackles $r^4$ and $r^5$ secured to the upper and lower springs carry transverse bolts $r^6$ and $r^7$ which may have anti-friction rollers if desired, between which plays the end of the flexing arm $b^3$.

A pull downward on the operating lever $b^4$ on either side (as by pressure forward on the pedal shown in Fig. 18) will increase the camber on that side, while a push upward (as by backward pressure on the pedal) will decrease the camber. Moreover, as will be observed from Figs. 8 and 14, the length of arms $b^3$ decreases steadily from the center outward toward the tip of each wing, hence the ratio of change is greater at the center and tapers down toward the tip. Greater stability will result from such tapering than if the arms $b^3$ were all of the same length so as to have their ends along a line parallel to the beam. In the latter case, greater action and results can be attained in so far as speed is concerned as a greater portion of the wing can be flattened giving least resistance and greatest speed; but it is preferable to structurally arrange the flexible trailing edge rib control as shown in Figure 14, as it gives greater liberty to the rib member through its own flexibility. Details of mechanism for controlling the flexible ribs from the fuselage are shown in Fig. 25, wherein: movement of lever 1, rocked to left turns rod 2, moving to left levers 3 and 4, which in turn pushes 5 and pulls 6—pushes 7 pulls 8 respectively—each in turn rocks 9 to left moving extension arm 10 upward and turning control lever 11 thus raising flexible ribs on left wing—on the right side the pulling of 6, rocks 12 and through 13 pulls downwardly extension arm 14, which in turn pulls down flexible ribs on right wing. Movement of 4 through 7 and 8 reverses movement of cutting edge beam, as 7 moving to left rocks 15 causing 16 to pull down cutting edge beam of left wing, while through 8 the reverse is had and cutting edge beam is raised on right wing. All movements resulting from rocking control 1 to left is shown by solid line arrows— movement of pushing control 1 forward is shown by dotted line arrows. Reverse movement of control arm reverses all action in each instance—one action will not interfere with the other—can be had in unison. Movement of control 1 forward through rod 17, 18, 19 and their connections, pulls downwardly cutting edge and trailing edge or ribs of both wings equally. Pulling backwards on 1 flattens both wings equally. Lever 20 by ratchet on 17 permits of varying the conjoint operative relation between the cutting edge control or movement and the trailing edge movement. The cutting edge thru this control can be changed without changing the control lever 1, that is raised or lowered in unison and without regard to rib control. The cutting edge beam is extended to and inside the fuselage where its end connects as shown. This beam's action is up and down at the fuselage, rocking on its hinge at the rigid point (Fig. 14) half way of wing.

Fig. 10 represents a fast monoplane with but little head resistance. Fig. 11 is a plan view of the same. Fig. 12 is a similar view to Figure 11 but showing improved direction controls by means of which the machine may be made to turn upon its own center. The fuselage follows closely the stream form of a bird's body and tail. No rudders are used. With a machine using a rudder the head continues in the original direction but by producing resistance on one side or the other of the tail, it is swung out of line to change direction. With changing of resistance at the wing tips as shown in Fig. 12, the machine will turn upon its center, automatically banking against the outer movement, because the outer wing on the turn must travel at greater speed and develop greater lift. As soon as the proper degree of bank is reached, the machine will properly stabilize, owing to the variable camber of the flexible ribs. Any movement of the machine to slip inwardly or toward the inside wing will result in greater compression on this inside wing in a direction toward the fuselage, while the reverse result will obtain of the outside wing, i. e. the tendency of compressed air will be to slip instead of compressing, and only the increased speed of the outer wing will cause it to maintain its lift.

To obtain the necessary resistance at the wing tips for this direction control, I use a pair of shutters, one secured near the end of each wing, as shown in Fig. 12. These are normally both closed and offer little or no resistance, as I prefer to arrange them in stream line hinged at the rear of the outermost struts of both wings. When either is opened by the wire control shown in Figs. 12, 12$^a$ and 12$^b$ it offers a resistance proportionate to the degree of opening, but in any case less than would be required with a rudder. The wires for controlling these shutters preferably pass through the wing section, reducing head resistance. Details of construction of the shutters are shown in Figures 22, 23, and 24.

The general outline of the fuselage is materially changed; instead of reducing its upper and lower surfaces and maintaining its wide surface on the sides as in general necessary for the rudder and elevator bracing, the fuselage is somewhat reduced in its width, top and bottom; while the sides are reduced materially, in fact follow a true stream line from near the center of pressure to just sufficient depth to maintain strength necessary for the elevator at the rear.

The elevator is of the same type construction as the herein described planes, having flexible ribs, but sufficiently enlarged to give positive and quick action, offering the least head resistance, as the leading edge for a great portion blends with the fuselage. By similar control to that of the rib members, wires, struts and necessary braces are eliminated. (See Figures 26, 27, and 28).

What I claim is:

1. An aerofoil having a pair of oppositely extending wings, elevating means, and means for changing direction comprising a pair of resistance devices, one attached to each wing, and means arranged within the wing to independently adjust said resistance devices to offer greater or less head on resistance on only one side or the other, whereby the aerofoil can be made to turn upon its center.

2. An aerofoil having a pair of wings, elevating means, and direction controlling means comprising a pair of folding shutters arranged to vary the head on resistance without affecting the lift, one attached near the tip of each wing, and means extending within the wing from said shutters to the center of the aerofoil, as to a fuselage attached thereto, for opening and closing the shutters alternately and oppositely.

3. In an aerofoil, the combination of a rigid weight sustaining arm or beam, means for positively changing the camber of the wings to the front and to the rear of said beam, and automatically flexing trailing edges for said wings, said positively controlled camber progressively decreasing from the center to the tips and said automatically flexing trailing edges increasing in flexibility toward the tips of the aerofoil.

4. In an aerofoil, the combination of a weight sustaining arm near the cutting edge with flexible rear cambered portion and trailing edge, manually operated means for controlling the camber of the rear cambered portion near the fuselage and partially controlling the flexible trailing edge near the fuselage, said flexible rear cambered portion and trailing edge near the tips of the wings being automatically controlled in response to variations in wind pressure.

5. In an aerofoil, the combination of a rigid weight sustaining arm near the cutting edge with a flexible rear cambered portion and trailing edge, manually operated means for controlling the camber of the rear cambered portion near the fuselage and partially controlling the flexible trailing edge near the fuselage said rear cambered portion and trailing edge near the tips of the wings being automatically controlled in response to variations in wind pressure, said manual control progressively decreasing from near the fuselage toward the tips of the wings and said automatic control progressively increasing from near the fuselage to the tips of the wings.

In testimony whereof I affix my signature.

CHARLIE O. PROWSE.